(12) United States Patent
Ziegler et al.

(10) Patent No.: US 7,746,030 B2
(45) Date of Patent: Jun. 29, 2010

(54) ACCUMULATOR PACKAGE WITH CHARGE STATE DISPLAY

(75) Inventors: Bernd Ziegler, Hiltenfingen (DE); Thomas Thanner, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 397 days.

(21) Appl. No.: 11/544,998

(22) Filed: Oct. 5, 2006

(65) Prior Publication Data
US 2007/0080667 A1 Apr. 12, 2007

(30) Foreign Application Priority Data
Oct. 10, 2005 (DE) .................. 10 2005 000 135

(51) Int. Cl.
*H02J 7/00* (2006.01)
(52) U.S. Cl. .................................. 320/132
(58) Field of Classification Search ............. 320/112, 320/113, 114, 132
See application file for complete search history.

(56) References Cited

U.S. PATENT DOCUMENTS

| | | | | |
|---|---|---|---|---|
| 5,898,290 A * | 4/1999 | Beard et al. | ................. | 307/150 |
| 6,078,164 A * | 6/2000 | Park | ........................... | 320/107 |
| 6,538,413 B1 * | 3/2003 | Beard et al. | ................. | 320/114 |
| 6,771,043 B2 * | 8/2004 | Matsunaga et al. | .......... | 320/114 |
| 7,029,142 B2 * | 4/2006 | Chen et al. | .................. | 362/119 |
| 7,157,882 B2 * | 1/2007 | Johnson et al. | ............. | 320/134 |
| 2004/0239293 A1 * | 12/2004 | Mori et al. | ................... | 320/132 |
| 2005/0007068 A1 * | 1/2005 | Johnson et al. | ............. | 320/110 |
| 2005/0135084 A1 * | 6/2005 | Chen et al. | .................. | 362/109 |

FOREIGN PATENT DOCUMENTS

DE 42044420 A1 8/1993
DE 29515860 U1 1/1996

* cited by examiner

*Primary Examiner*—Edward Tso
*Assistant Examiner*—Ramy Ramadan
(74) *Attorney, Agent, or Firm*—Abelman, Frayne & Schwab

(57) ABSTRACT

An accumulator package (2) for a hand-held power tool includes:
a housing (4) having a plurality of accumulator cells (28) provided therein, a connection element (18) electrically connected with the accumulator cells (28) and accessible from outside, a charge state display (22) for displaying a charge state of the accumulator cells (28), a locking mechanism (14) for securing the accumulator package (2) on the power tool, and locking mechanism-operating elements (16) that simultaneously form accessible from outside outer switch elements for actuating the charge state display.

7 Claims, 2 Drawing Sheets

ACCUMULATOR PACKAGE WITH CHARGE STATE DISPLAY

BACKGROUND OF THE INVENTION

1. Field of the Invention

The present invention relates to an accumulator package for a hand-held power tool such as, e.g., an accumulator-driven screw-driving tool, drilling tool, or wood-machining tool. The accumulator package includes a housing having a plurality of accumulator cells provided therein and a connection element electrically connected with the accumulator cells and accessible from outside. There is further provided a charge state display for displaying a charge state of the accumulator cells and which is actuated by outer switch means accessible from the outside.

With such accumulator packages the charge state can be ascertained each time by actuation of the outer switch means, e.g., in order to be able to charge the accumulator by a suitable time.

2. Description of the Prior Art

German Utility model DE 295 15 860 U1 discloses an accumulator package with an integrated charge state display. The charge state display is actuated by a push-button that projects outwardly through a side of the accumulator package housing.

The use of a push-button for actuating the charge state display, as needed, prevents an additional discharge of the accumulator cells by an actuated charge state display during extended idle or stop time.

The drawback of the known accumulator package consists in that the push-button, in particular because it projects through the housing, increases manufacturing costs and creates sealing problems. In addition, with such an accumulator package, in many applications, there exists a danger of the outwardly projecting push-button being broken off. Further, with the use of such a charge state display which is actuated as needed, it often happens that the operator forgets from time to time to check the charge state. As a result, a suitable moment for charging the accumulator package can be missed, in consequence of which the operator must interrupt a certain operational cycle at an unfavorable time in the operation to charge the accumulator package.

German Publication DE 42 04 420 A1 discloses an accumulator-driven electrical tool with the charge state display pinned on the accumulator package. The charge state display includes an LCD-display that permanently displays the charge state, and two light-emitting diodes a respective one of which lightens up upon actuation of the electrical tool in order to show whether the charge state is sufficient or too small for the actual tool adjustments.

The drawback of the accumulator package described above lies in that the LCD-display leads to a continuous additional discharge which becomes particularly noticeable at long stoppage periods. On the other hand, the light-emitting diodes are actuated in connection with the electrical tool.

Accordingly, an object of the present invention is to provide an accumulator package for a power tool in which the above-described drawbacks are eliminated.

Another object of the present invention is to provide an accumulator package in which in addition to the prevention of the unnecessary discharge, a repeated testing of the charge state is ensured.

SUMMARY OF THE INVENTION

These and other objects of the present invention, which will become apparent hereinafter, are achieved by providing locking mechanism-operating means that simultaneously form accessible from the outside outer switch means for actuating the charge state display.

On the one hand, the charge state is displayed thereby as needed, so that a continuous discharge is eliminated. On the other hand, with actuation of the locking mechanism for releasing it from the power tool the charge state is displayed at the same time. This allows the operator to observe regularly and automatically a respective charge state. Further, the integration of the switch means of the charge state display into the operating means of the locking mechanism eliminates the formation of an additional opening in the housing and it eliminates an additional switch means. This reduces manufacturing costs.

According to an advantageous embodiment of the present invention, the accumulator package includes measurement electronics connected with the charge state display, and inner switch means located in the housing for actuating the measurement electronics and mechanically connected with the locking mechanism-operating means. The measurement electronics and the related switch means can be formed as a pre-assembled sub-assembly, which facilitates the assembly of the accumulator package.

Advantageously, the locking mechanism-operating means includes a locking member, and the accumulator package has a pressure member connected with the locking member and associated with the inner switch means, thereby providing for mechanical connection of the inner switch means with the locking mechanism-operating means. Thus, the operating means can be modified, particularly cost-effectively for actuating both the locking mechanism and the switch means of the measurement electronics.

Advantageously, the locking mechanism-operating means includes two push-buttons arranged on opposite sides of the accumulator package, with the measurement electronics being actuated by at least one of the push-buttons. Thereby, the measurement electronics can be actuated from one or another side of the accumulator package. In addition, it is possible to actuate the measurement electronics by actuating a single push-button, without simultaneously releasing the locking mechanism.

Alternatively, the measurement electronics can be actuated only with actuation of both push-buttons simultaneously. This prevents an inadvertent actuation of the charge state display.

It is particularly advantageous when the measurement electronics have a timer for deactuating the charge state display after expiration of a predetermined time period after actuation of the charge state display, e.g., after 3 seconds. Such a timer can be formed as a separate integrated switching circuit or as a time function of software. In either case, actuation of the charge state display by an inadvertent extended application of pressure to a push-button, or both push-buttons, e.g., during storage in a tool case, for an extended period of time and, thereby, a more rapid discharge of the accumulator cells is prevented.

It is advantageous when the charge state display has a plurality of light-emitting diodes (LEDs) a different number of which is actuated, upon actuation of the measurement electronics, dependent on a measured charge state. This permits to obtain a particularly long-lasting and economical charge state display.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show.

DETAILED DESCRIPTION OF THE PREFERRED EMBODIMENTS

Figure 1:
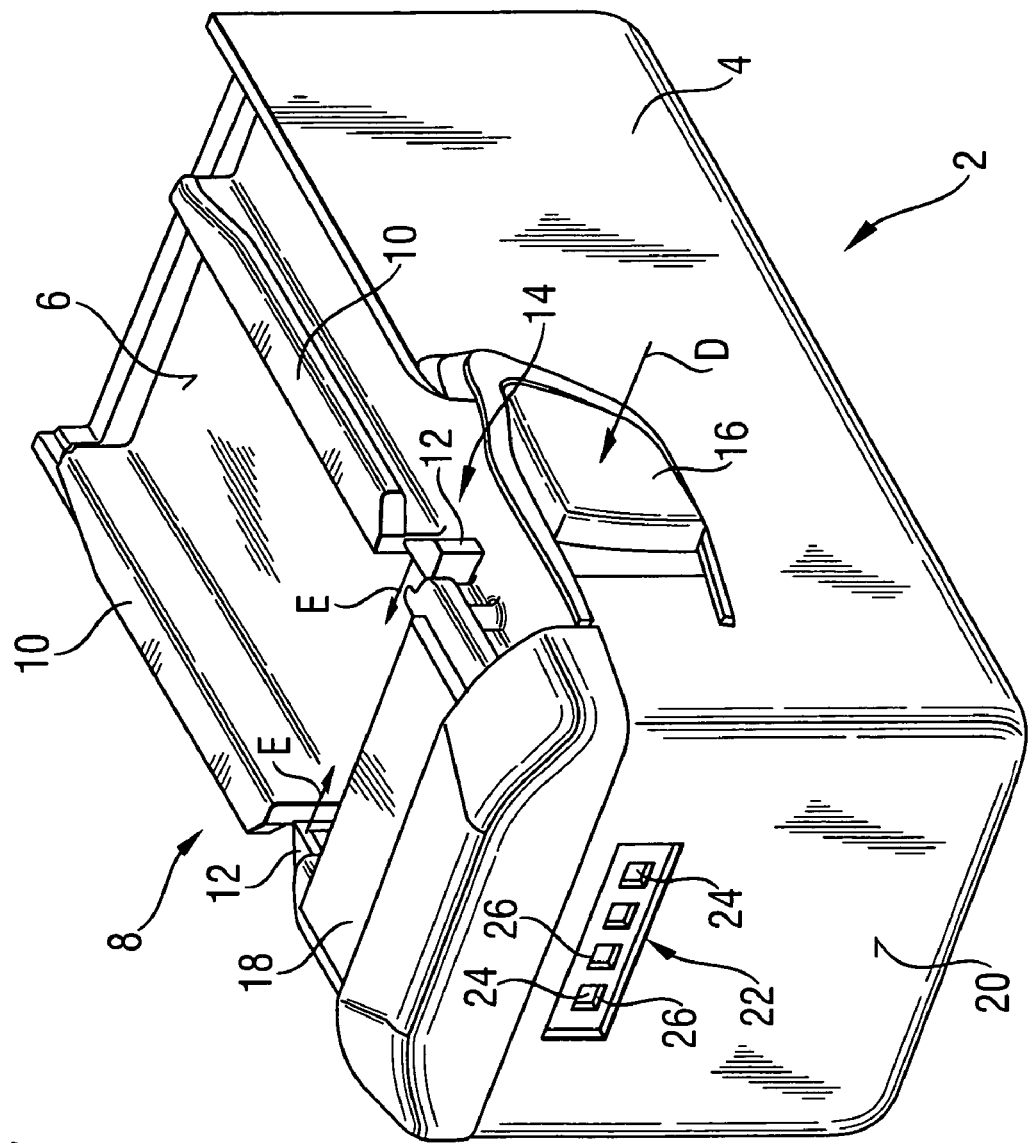
FIG. 1 a perspective view of an accumulator package according to the present invention.

FIG. 1 shows an accumulator package 2 of a power tool, not shown, such as an accumulator-driven screw-driving or drilling tool. The accumulator package 2 has a housing 4 on an upper side 6 of which, there is formed locking means 8 with which the accumulator package 2 can be retained on corresponding counter-locking means of the power tool. The locking means 8 has two engagement rails 10 at one end of which there is provided, respectively, a locking member 12 displaceable transverse to the longitudinal direction of the engagement rails 10.

Both locking members 12 form part of a locking mechanism designated generally with a reference numeral 14. With the locking mechanism 14, the accumulator package 2 is secured on the power tool. The accumulator package 2 is brought into a release position by simultaneous actuation of two operational elements 16 which are formed as push-buttons and are displaced, upon their actuation, in the pressure direction D as shown with arrow E.

Further, the accumulator package 2 has, on the upper side 6 of the housing 4, in addition to the locking members 12, a connection member 18 for connection with electrical contacts, not shown, of the power tool. On the front side 20 of the housing 4, there is provided a charge state display 22 having four light-emitting diodes (LEDs) 24 arranged in located next to each other, four housing openings 26.

Figure 2:
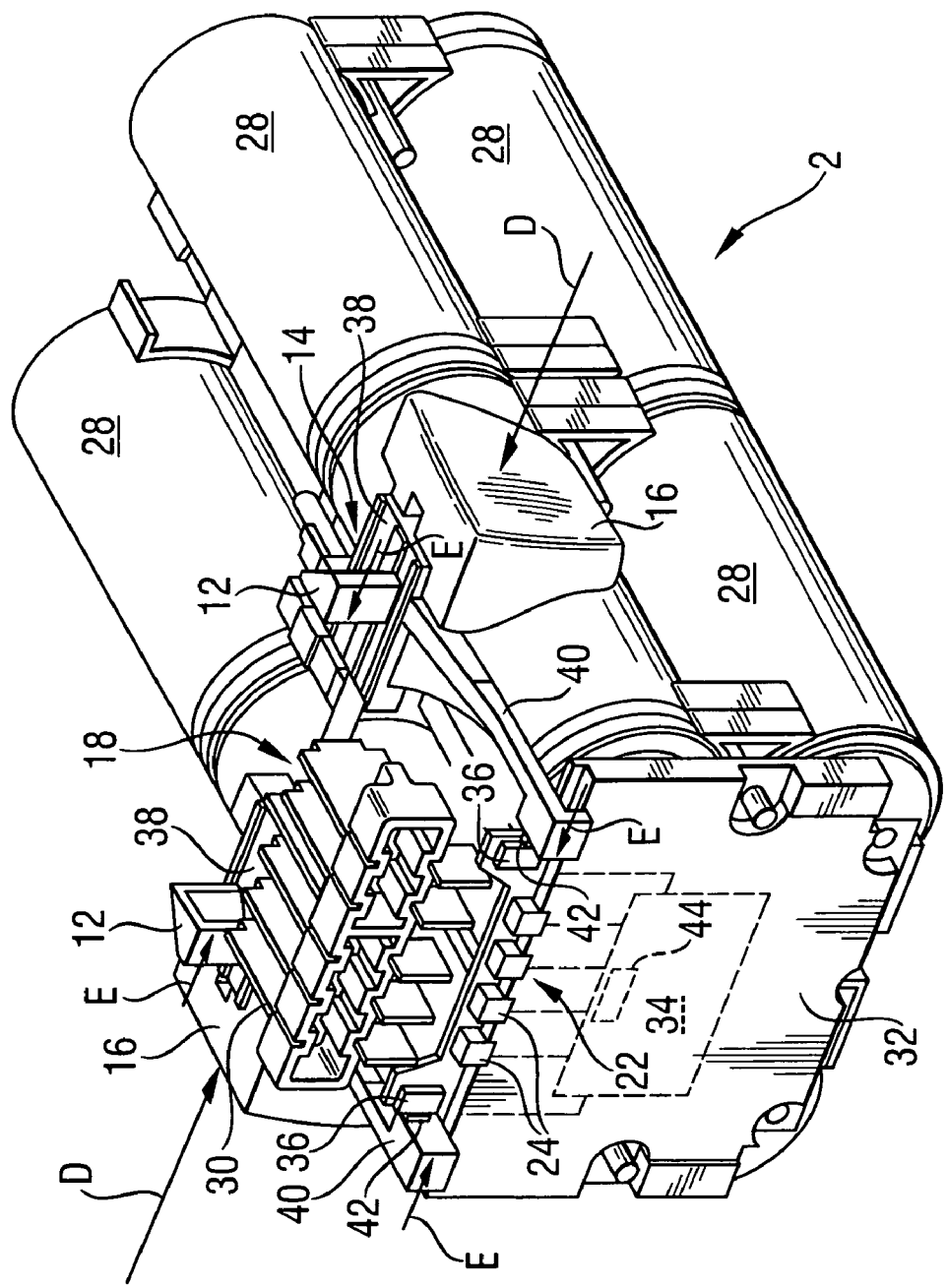
FIG. 2 a perspective view of the accumulator package according to the present invention and shown in FIG. 1, with the housing being removed.

As shown in FIG. 2, the accumulator package 2 has a plurality of accumulator cells 28 which are electrically connected, in a manner not shown in the drawing, with contacts 30 of the connection member 18. There is further provided a board 32 that carries schematically shown measurement electronics 34 for measuring the charge state of the accumulator cells 28. The measurement electronics 34 is connected with LEDs 24. In addition, on the board 32, there are provided two internal switch elements 36 in the form of microswitches which actuate the measurement electronics 34.

As further shown in FIG. 2, the operational elements 16 are arranged on opposite sides of the accumulator package 2 and are fitted on respective slides 38 on which respective locking members 12 are formed. A pressure member 40, which adjoins a respective plunger element 42 of a respective inner switch element 36, projects from each slide 38. In this way, each of the two operational elements 16 is mechanically connected via a respective slide 38 and a respective pressure member 40 with a respective inner switch element 36.

When only one of the operational elements 16 is displaced in the pressure direction D by application of pressure thereto, it displaces the slide 38 and, together with the slide 38, a respective pressure member 40 against a biasing spring, not shown, in the direction E. Thereby only one plunger element 42 of the inner switch elements 36, which the pressure member 40 adjoins, is actuated. The respective inner switch element 36 actuates the measurement electronics 34 that measures the charge state of the accumulator cells 28 and actuates, dependent on the measurement results, one, two, three, or all four of the LEDs 24.

The measurement electronics 34 can be so designed that it is actuated only upon a simultaneous actuation of both inner switch elements 36 or upon actuation of only one of the inner switch elements 36.

Because the operational elements 16 also serve simultaneously as accessible from outside, outer switch elements for releasing the locking elements 12, the charge state display 22 is actuated each time when the locking mechanism 14 is released upon actuation of both operational elements 16, e.g., in order to remove the accumulator package 2 from the power tool.

As soon as pressure in the pressure direction D is removed from the operational elements 16, the slides 38 are displaced in the direction opposite the direction E to their initial position by a spring not shown. Simultaneously, the pressure, which the pressure members 40 apply to the plunger elements 42 of the inner switch means 36, is also released, which turns off the measurement electronics 34.

The measurement electronic 34 also includes a timer 44, e.g., in form of an integrated switching circuit or as a software function which turns off or deactuates the charge state display 22 after three seconds the display 22 has been actuated by the inner switch element(s) 36.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:
1. An accumulator package (2) for a hand-held power tool, comprising:
a housing (4) having a plurality of accumulator cells (28) provided therein;
connection means (18) electrically connected with the accumulator cells (28) and accessible from outside;
a charge state display (22) for displaying a charge state of the accumulator cells (28);
a locking mechanism (14) for securing the accumulator package (2) on the power tool; and
means (16) for operating the locking mechanism (14), wherein the locking mechanism-operating means (16) includes outer switch means for actuating the charge state display (22), with the outer switch means being simultaneously accessible from outside of the housing (4).
2. An accumulator package according to claim 1, further comprising measurement electronics (34) connected with the charge state display (22), and inner switch means (36) located in the housing (4) for actuating the measurement electronics (34) and mechanically connected with the locking mechanism-operating means (16).

3. An accumulator package according to claim 2, wherein the locking mechanism-operating means (16) comprises a locking member (12), and the accumulator package (2) comprises a pressure member (40) connected with the locking member (12) and associated with the inner switch means (36), thereby providing a mechanical connection between the inner switch means (36) and the locking mechanism-operating means (16).

4. An accumulator package according to claim 2, wherein the locking mechanism-operating means (16) comprises two push-buttons arranged on opposite sides of the accumulator package (2), with the measurement electronics (34) being actuated by at least one of the push-buttons.

5. An accumulator package according to claim 4, wherein the measurement electronics (34) is actuated by simultaneous actuation of both of the push-buttons.

6. An accumulator package according to claim 2, wherein the measurement electronics (34) has a timer for deactuating of the charge state display (22) after expiration of a predetermined time after actuation of the charge state display (22).

7. An accumulator package according to claim 1, wherein the charge state display (22) comprises a plurality of LEDs (24), wherein, upon actuation of the measurement electronics (34), at least a portion of the plurality of LEDs (24) are actuated, wherein the number of actuated LEDs is dependent on a measured charge state.

* * * * *